United States Patent Office 3,258,773
Patented June 28, 1966

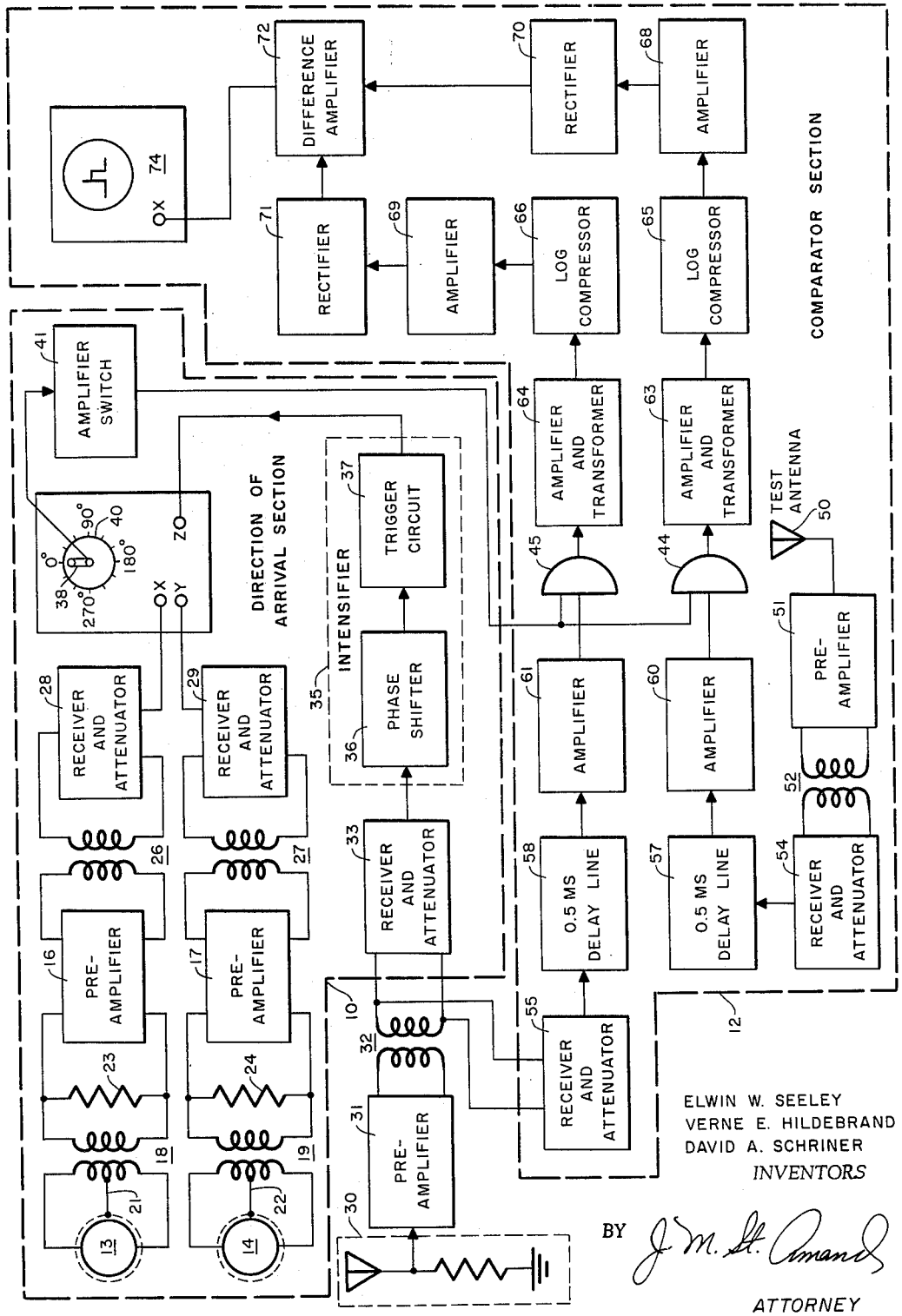

3,258,773
ANTENNA PASSIVE PATTERN PLOTTER
Elwin W. Seeley and Verne E. Hildebrand, Riverside, and David A. Schriner, Corona, Calif., assignors to the United States of America as represented by the Secretary of the Navy
Filed Nov. 8, 1963, Ser. No. 322,543
5 Claims. (Cl. 343—100)

The invention herein described may be manufactured and used by or for the Government of the United States of America for governmental purposes without the payment of any royalties thereon or therefor.

The present invention relates to antenna systems and more particularly to an antenna passive pattern plotter for measuring the reception pattern of low and VLF antennas without the use of a transmitter.

Low and VLF antenna arrays are by necessity large and immovable, and to get beyond the near field the reception pattern must be measured over a circle many miles in diameter. Old methods of measurements were made either by flying or driving a transmitter or receiver in a circle many miles in diameter about the test antenna. This invention uses sferics or lightning pulses as the source of RF energy to measure the test antenna pattern. Sferics radiate much more power than a movable transmitter and allow more accuracy in the pattern measurement. Since the system of the present invention takes advantage of a free source of untapped power, lightining sferics, a transmitter is not required to be flown or driven around the test antenna as does the old method.

It is an object of the invention therefore to provide a system for plotting the antenna patterns of VLF antennas.

It is another object of the invention to provide an antenna passive pattern plotter for measuring the reception pattern of low and VLF antennas without the use of a transmitter.

It is a further object of the invention to provide a system for plotting the antenna patterns of low and VLF antennas using the radiation from lightning sferics.

Ather objects and many of the attendant advantages of this invention will become readily appreciated as the same becomes better understood by reference to the following detailed description when considered in connection with the accompanying drawings wherein:

The figure of drawing is a diagrammatic block diagram of one embodiment of the passive pattern plotter system of the present invention.

In general the passive pattern plotter system of the present invention is divided into two main parts. The direction of arrival section 10 and the comparator section 12. The direction of arrival section 10 contains circuitry necessary to indicate the direction of arrival of an acceptable signal on a test antenna. The comparator section 12 contains circuitry needed for indicating the relative amplitudes between the test and standard antennas upon receipt of a signal from a particular direction and of minimum amplitude.

As shown in the figure of drawing, direction of arrival section 10 contains two loop antennas 13 and 14. Antennas 13 and 14 are in close proximity to each other and are perpendicular to one another. The impedance looking back into each antenna is, for example, approximately 2 ohms. Pre-amplifiers 16 and 17 are coupled to antennas 13 and 14 respectively by transformers 18 and 19. Twisted pairs of shielded wire should be used to connect the antennas 13 and 14 to transformers 18 and 19. Center taps 21 and 22 from the primary windings of transformers 18 and 19 are connected to the respective shields of antennas 13 and 14 respectively. Resistors 23 and 24, 1K ohm for example, are placed across the secondary of transformers 18 and 19; this resistance reflects back to the primary windings a lower impedance than for optimum antenna loads. This mis-match then lowers the Q of the antennas thus eliminating the antenna resonant peak. Without this measure, the signals at the antenna resonant frequency would saturate the pre-amplifiers 16 and 17. Transformers 26 and 27 are used to match the output of pre-amplifiers 16 and 17 to the attenuators of receivers and attenuators 28 and 29 respectively. The attenuators should be a variable T-pad type which always present a constant input impedance into the receiver; the receiver section contains a filter, a transformer for matching purposes and an amplifier, and have a linear dynamic range. The receivers should be matched pairs as far as frequency response is concerned in order to prevent unusual swirling results on the direction of arrival presentation.

A whip antenna 30 is used as a standard antenna for comparison purposes in the comparator section and as a method for obtaining signals to modulate the Z-axis of the oscilloscope being used for direction of arrival presentation. Signals from antenna 30 are fed to pre-amplifier 31, and transformer 32, similar to transformers 26 and 27, is used to match the output of pre-amplifier 31 to the attenuator of receiver and attenuator 33, which is similar to receiver and attenuators 28 and 29. Intensifier 35 is composed of a phase shifter 36 and a Schmitt trigger circuit 37. Phase shifter 36 shifts the signal from whip antenna 30 into phase with the direction of arrival loop antenna signals. Trigger circuit 37 rectifies and sets the level for modulating the Z-axis for direction of arrival presentation. These circuits of intensifier 35 provide a method for indicating signals from one direction and for setting a minimum level for direction of arrival presentation. The Z-axis circuits of the oscilloscope are specially modified for Z-azis modulation.

A photo-transistor device 38 is used for detecting the direction of arrival presentation in specific direction from the oscilloscope 40. In the photo-transistor device 38 a photo-transistor is rotated on a shaft around the periphery of the cathode ray tube of oscilloscope 40 for direction of arrival bearing. The periphery of oscilloscope 40 is marked in degrees. However, a more elaborate method for recording direction may be easily accomplished for automatic recording. Associated amplifier and switch circuits 41 connected to the photo-transistor device 38 amplify and square the detected direction of arrival signal, which signal in turn opens gates 44 and 45 in comparator section 12 of the passive pattern plotter system allowing the appropriate signals to appear for relative gain comparisons.

In comparator section 12 signals from a test antenna 50 are fed to a pre-amplifier 51 which is similar to pre-amplifiers 16 and 17 of direction of arrival section 10. Transformer 52 is used to match the output of pre-amplifier 51 to the T-pad attenuator of receiver and attenuator 54. The secondary winding of transformer 32 is also connected across receiver and attenuator 55. Both receiver and attenuators 54 and 55 are similar to receiver and attenuators 28 and 29. The outputs of receiver and attenuators 54 and 55 are fed to (.5 millisecond) delay lines 57 and 58 respectively which in turn are connected to amplifiers 60 and 61. These delay lines are needed to compensate for the delay that occurs before the photo-transistor 38 may detect the peaks of the direction of arrival presentation. A .5 millisecond delay would assure that the transmission gates 44 and 45 are open before the signal arrives and the gate inputs. Amplifiers 60 and 61 are used to drive the transmission gates 44 and 45 respectively. Transmission gates 44 and 45 are inhibited until a signal from the direction of arrival presentation opens the gates to allow the comparator signals to come through. Amplifier and transformer circuits 63 and 64 are used to step up the signal to the value required by the logarithmic compressors 65 and 66 for a particular linear output range. Logarithmic voltage compressors 65 and 66 produce an output voltage proportional to the logarithm of the input from amplifier and transformer circuits 63 and 64 respectively. The output voltage amplitudes from the logarithmic voltage compressors are too small to rectify, and it is therefore necessary to amplify these signals before rectification by means of amplifiers 68 and 69 respectively. The outputs of amplifiers 68 and 69 are fed to full wave bridge rectifiers 70 and 71 to detect the envelopes of the comparator signals. Envelope detection is necessary to help reduce significant phase differences that may occur from the test antenna 50. The outputs of rectifiers 70 and 71 are fed to difference amplifier 72 that is used to detect the difference signal from the comparator channels. The detected difference is then observed on an oscilloscope 74 indicating relative signal amplitudes from the test antennas.

The passive pattern plotter of this invention can be used to plot patterns of many different types of test antennas including loop antennas of different sizes and shapes and a variety of loop arrays.

In general, the antenna passive pattern plotter consists of two parts as previously described, the direction of arrival section 10 and the comparator section 12. The direction of the lightning sferics is measured by the direction of arrival section 10 which consists of two loop antennas 13 and 14 whose planes are oriented 90° to each other. After filtering to the desired bandwidth, the signals from these two antenna loops are applied to the X and Y terminals of oscilloscope 40 and a thin trace emanating from the center of the oscilloscope cathode ray tube indicates the direction of the sferics. The Z-axis of oscilloscope 40 is modulated by the signal from omnidirectional monopole standard antenna 30 so as to turn the cathode ray tube on only when the positive portion of the sferics signal is being received by the antennas 13 and 14. Comparator section 12 of the system receives the signals from both the monopole standard antenna 30 and from the test antenna 50 on two separate channels. These signals are filtered to the desired bandwidth, delayed and amplified and applied to transmission gates 44 and 45. Gates 44 and 45 are normally closed and are only opened by a signal from a photodetector on the face of oscilloscope tube 40. The photodetector 38 may be rotated 360° on the face of the direction of arrival oscilloscope tube 40; it may be placed at the proper position to receive the light from a sferics trace at the desired direction of arrival angle. The generated pulse in photodetector 38 is then used to open the transmission gates 44 and 45 and allow the signal from the standard monopole 30 and test antenna 50 to be applied to the log compressors 65 and 66. The outputs from the log compressors 65 and 66 are the logarithm of the input signals. The two output signals are applied to differential amplifier 72 where they are subtracted. The results of subtracting the logarithms of two signals is the ratio of the two signals. This ratio may be plotted versus the angle of arrival of the signal on polar graph paper to obtain the reception pattern.

Obviously many modifications and variations of the present invention are possible in the light of the above teachings. It is therefore to be understood that within the scope of the appended claims the invention may be practiced otherwise than is specifically described.

What is claimed is:

1. An electronic system for plotting the reception pattern of an antenna by determining and displaying the direction of atmospheric RF disturbances and simultaneously detecting and displaying the amplitude of said disturbances as received by the antenna under test, comprising in combination:
   (a) a standard antenna for comparison purposes;
   (b) a direction of arrival indicator means for determining the direction of sferics and consisting of
      (1) two loop antennas,
      (2) readout means having X, Y and Z axis terminals,
      (3) means for applying signals from said loop antennas to the X and Y terminals of said readout means which indicates the direction of the sferics,
      (4) the Z axis of said readout means being modulated by signals from said standard antenna to turn on the readout means only during a positive portion of sferics being received by said antennas;
   (c) a comparator means which receives signals from both said standard antenna and the antenna under test on two separate channels, and consisting of
      (1) gating means,
      (2) means for filtering, delaying, amplifying and applying each of the signals from both said standard antenna and said test antenna to said gating means,
      (3) said gating means being normally closed and only opened by a signal from said direction of arrival indicator readout means thus allowing signals from said standard antenna and said test antenna to pass,
      (4) the signals from said test and standard antennas passing said gating means being applied to respective log compressor means the outputs of which are logarithms of the input signals,
      (5) differential amplifier means to which the outputs of said log compressor means are applied to obtain the ratio of the two signals,
      (6) said ratio being plotted against the angle of arrival of the sferics indicated by said direction of arrival indicator means to obtain the reception pattern of said test antenna.

2. A device as in claim 1 wherein said readout means is a cathode ray tube having a photodetector which may rotate 360° on the face thereof to detect light from a sferic trace at the direction of arrival angle of the sferics.

3. An electronic system for plotting the reception pattern of an antenna by determining and displaying the direction of atmospheric RF disturbances and simultaneously detecting and displaying the amplitude of said disturbances as received by the antenna under test, comprising in combination:
   (a) a standard antenna for comparison purposes;
   (b) a direction of arrival indicator means for determining the direction of sferics and consisting of
      (1) two loop antennas,
      (2) readout means,
      (3) means for applying signals from said loop antennas to said readout means which indicates the direction of the sferics,
      (4) said readout means being modulated by signals from said standard antenna to turn on the readout means only during a positive portion of sferics being received by said antennas;
   (c) a comparator means which receives signals from both said standard antenna and the antenna under test, and consisting of,
      (1) gating means,
      (2) means for applying each of the signals from both said standard antenna and said test antenna to said gating means,
      (3) said gating means being normally closed and only opened by a signal from said direction of arrival indicator readout means thus allowing signals from said standard antenna and said test antenna to pass,
      (4) the signals from said test and standard antennas passing said gating means being applied to respective log compressor means the outputs of which are logarithms of the input signals,
(5) differential amplifier means to which the outputs of said log compressor means are applied to obtain the ratio of the two signals,
(6) said ratio being plotted against the angle of arrival of the sferics indicated by said direction of arrival indicator means to obtain the reception pattern of said test antenna.

4. An electronic system for plotting the reception pattern of an antenna by determining and displaying the direction of atmospheric RF disturbances and simultaneously detecting and displaying the amplitude of said disturbances as received by the antenna under test, comprising in combination:
  (a) a standard antenna for comparison purposes;
  (b) a direction of arrival indicator means for determining the direction of sferics and consisting of
    (1) two loop antennas,
    (2) readout means,
    (3) means for applying signals from said loop antennas to said readout means which indicates the direction of the sferics,
    (4) said readout means being modulated by signals from said standard antenna to turn on the readout means only during a positive portion of sferics being received by said antennas,
  (c) a comparator means which receives signals from both said standard antenna and the antenna under test, and consisting of,
    (1) gating means,
    (2) means for applying each of the signals from both said standard antenna and said test antenna to said gating means,
    (3) said gating means being normally closed and only opened by a signal from said direction of arrival indicator readout means thus allowing signals from said standard antenna and said test antenna to pass,
    (4) the signals from said test and standard antennas which pass said gating means being applied to means for obtaining the ratio of these two signals,
    (5) said ratio being plotted against the angle of arrival of the sferics indicated by said direction of arrival indicator means to obtain the reception pattern of said test antenna.

5. An electronic system for plotting the reception pattern of an antenna by determining and displaying the direction of atmospheric RF disturbances and simultaneously detecting and displaying the amplitude of said disturbances as received by the antenna under test, comprising in combination:
  (a) a standard antenna for comparison purposes;
  (b) a direction of arrival indicator means for determining the direction of sferics,
  (c) a comparator means which receives signals from both said standard antenna and the antenna under test, and consisting of,
    (1) gating means,
    (2) means for applying each of the signals from both said standard antenna and said test antenna to said gating means,
    (3) said gating means being normally closed and only opened by a signal from said direction of arrival indicator means thus allowing signals from said standard antenna and said test antenna to pass,
    (4) the signals from said test and standard antennas which pass said gating means being applied to means for obtaining the ratio of these two signals,
    (5) said ratio being plotted against the angle of arrival of the sferics indicated by said direction of arrival indicator means to obtain the reception pattern of said test antenna.

References Cited by the Examiner
UNITED STATES PATENTS

| | | | |
|---|---|---|---|
| 2,878,468 | 3/1959 | Kuder | 343—100 |
| 3,166,748 | 1/1965 | Shanks et al. | 343—100 |

CHESTER L. JUSTUS, *Primary Examiner.*

R. E. BERGER, *Assistant Examiner.*